United States Patent
Savage et al.

(10) Patent No.: US 11,989,305 B2
(45) Date of Patent: May 21, 2024

(54) AUTOMATED UPDATE OF A CUSTOMIZED SECURE BOOT POLICY

(71) Applicant: Dell Products L.P., Round Rock, TX (US)

(72) Inventors: Marshal F. Savage, Austin, TX (US); William C. Munger, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 34 days.

(21) Appl. No.: 17/870,459

(22) Filed: Jul. 21, 2022

(65) Prior Publication Data

US 2024/0028735 A1 Jan. 25, 2024

(51) Int. Cl.
*G06F 1/24* (2006.01)
*G06F 21/57* (2013.01)
*H04L 9/32* (2006.01)
*G06F 9/4401* (2018.01)

(52) U.S. Cl.
CPC .......... *G06F 21/575* (2013.01); *G06F 21/572* (2013.01); *H04L 9/3236* (2013.01); *H04L 9/3247* (2013.01); *G06F 9/4401* (2013.01)

(58) Field of Classification Search
CPC ... G06F 21/575; G06F 21/572; H04L 9/3236; H04L 9/3247
USPC .......................................................... 713/2
See application file for complete search history.

(56) References Cited

U.S. PATENT DOCUMENTS

| | | | | |
|---|---|---|---|---|
| 9,164,775 | B2* | 10/2015 | Shutt | G06F 9/4416 |
| 11,782,593 | B1* | 10/2023 | Dluhy | G06F 3/04883 |
| | | | | 345/173 |
| 11,783,041 | B2* | 10/2023 | Park | G06F 8/65 |
| | | | | 713/2 |
| 2005/0144616 | A1* | 6/2005 | Hammond | G06F 8/65 |
| | | | | 717/173 |
| 2009/0276512 | A1* | 11/2009 | Holdaway | G06F 9/4405 |
| | | | | 709/223 |
| 2013/0185564 | A1* | 7/2013 | Jaber | G06F 21/57 |
| | | | | 713/176 |
| 2014/0068585 | A1* | 3/2014 | Young | G06F 21/572 |
| | | | | 717/168 |
| 2017/0098084 | A1* | 4/2017 | Kulkarni | H04L 63/20 |
| 2018/0075242 | A1* | 3/2018 | Khatri | H04L 9/3263 |
| 2020/0218811 | A1* | 7/2020 | Rangel-Martinez | |
| | | | | G06F 21/572 |
| 2020/0293658 | A1* | 9/2020 | Krishna Murthy | H04L 67/125 |
| 2021/0365558 | A1* | 11/2021 | Samuel | G06F 21/602 |
| 2022/0327215 | A1* | 10/2022 | Preimesberger | G06F 9/4406 |

(Continued)

*Primary Examiner* — Volvick Derose
(74) *Attorney, Agent, or Firm* — Larson Newman, LLP

(57) ABSTRACT

An information handling system includes a memory, a baseboard management controller (BMC), and a basic input/output system (BIOS). The memory stores a secure boot policy for a plurality of input/output (I/O) devices in the information handling system. The BMC performs a firmware update for a first I/O device of the I/O devices. In response to the firmware update being completed successfully, the BMC creates a system management task. During a next boot after the creation of the system management task, the BIOS detects the system management task. The BIOS calculates a new hash value for a firmware image of the firmware update. The BIOS replaces a previous hash value with the new hash value in the secure boot policy.

14 Claims, 8 Drawing Sheets

(56) References Cited

U.S. PATENT DOCUMENTS

| | | | | |
|---|---|---|---|---|
| 2023/0133726 A1* | 5/2023 | Wen | ...................... | G06F 21/575 713/2 |
| 2023/0246827 A1* | 8/2023 | Luciani, Jr. | ........... | G06F 21/572 713/189 |

* cited by examiner

AUTOMATED UPDATE OF A CUSTOMIZED SECURE BOOT POLICY

CROSS REFERENCE TO RELATED APPLICATION

Related subject matter is contained in co-pending U.S. application Ser. No. 17/870,422 entitled "AUTOMATED UPDATE OF A CUSTOMIZED SECURE BOOT POLICY," filed Jul. 21, 2022, the disclosure of which is hereby incorporated by reference.

FIELD OF THE DISCLOSURE

The present disclosure generally relates to information handling systems, and more particularly relates to automated update of a customized secure boot policy.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory, a baseboard management controller (BMC), and a basic input/output system (BIOS). The memory may store a secure boot policy for a plurality of input/output (I/O) devices in the information handling system. The BMC may perform a firmware update for a first I/O device of the I/O devices. In response to the firmware update being completed successfully, the BMC may create a system management task. During a next boot after the creation of the system management task, the BIOS may detect the system management task. The BIOS may calculate a new hash value for a firmware image of the firmware update. The BIOS may replace a previous hash value with the new hash value in the secure boot policy.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
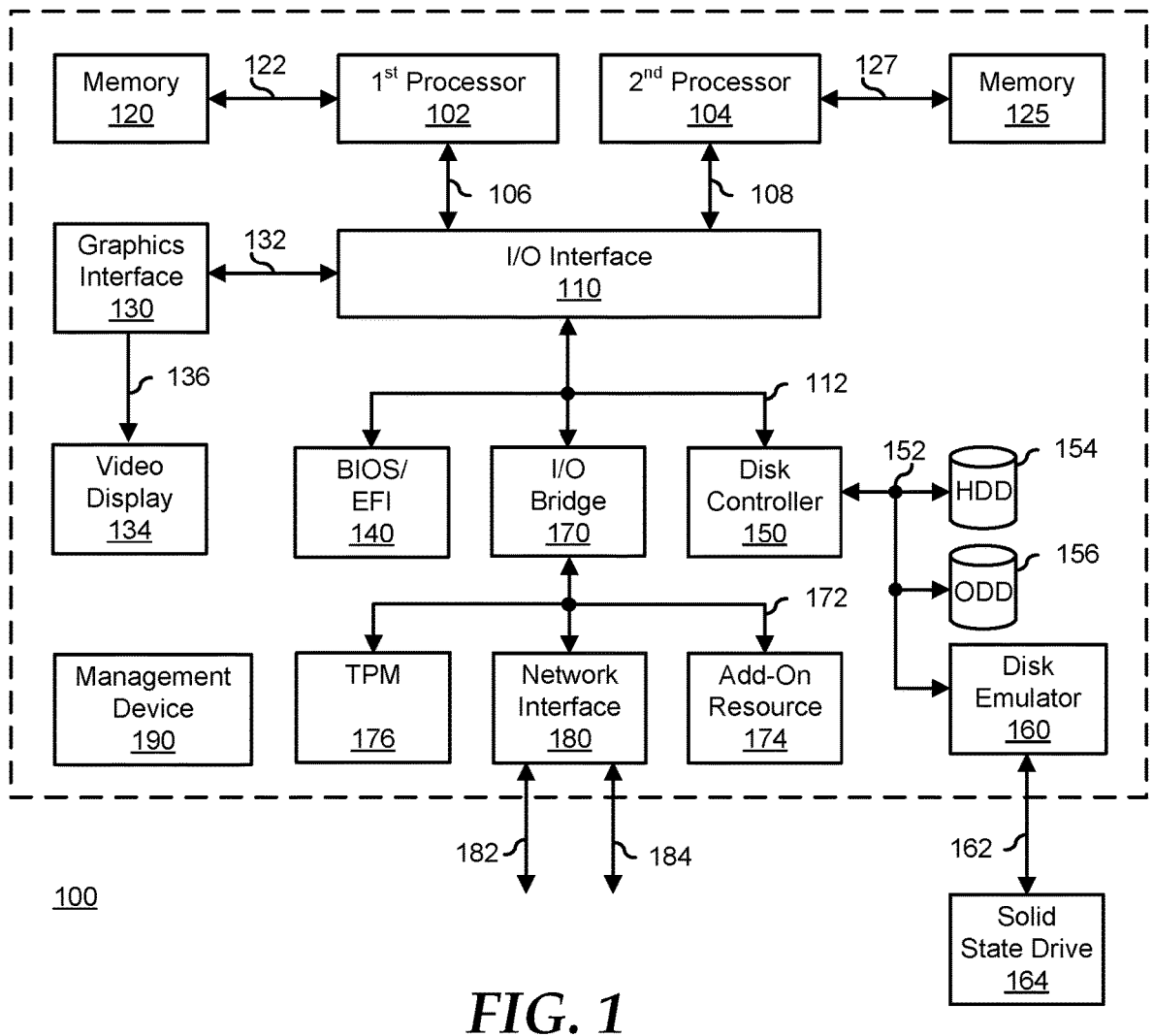
FIG. 1 is a block diagram of a general information handling system according to an embodiment of the present disclosure.

FIG. 1 shows a generalized embodiment of an information handling system 100 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below and operates to perform one or more of the methods described below. Information handling system 100 includes a processors 102 and 104, an input/output (I/O) interface 110, memories 120 and 125, a graphics interface 130, a basic input and output system/universal extensible firmware interface (BIOS/UEFI) module 140, a disk controller 150, a hard disk drive (HDD) 154, an optical disk drive (ODD) 156, a disk emulator 160 connected to an external solid state drive (SSD) 162, an I/O bridge 170, one or more add-on resources 174, a trusted platform module (TPM) 176, a network interface 180, a management device 190, and a power supply 195. Processors 102 and 104, I/O interface 110, memory 120, graphics interface 130, BIOS/UEFI module 140, disk controller 150, HDD 154, ODD 156, disk emulator 160, SSD 162, I/O bridge 170, add-on resources 174, TPM 176, and network interface 180 operate together to provide a host environment of information handling system 100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 100.

In the host environment, processor 102 is connected to I/O interface 110 via processor interface 106, and processor 104 is connected to the I/O interface via processor interface 108. Memory 120 is connected to processor 102 via a memory interface 122. Memory 125 is connected to processor 104 via a memory interface 127. Graphics interface 130 is connected to I/O interface 110 via a graphics interface 132 and provides a video display output 136 to a video display 134. In a particular embodiment, information handling system 100 includes separate memories that are dedicated to each of processors 102 and 104 via separate memory interfaces. An example of memories 120 and 125 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 140, disk controller 150, and I/O bridge 170 are connected to I/O interface 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 140 includes BIOS/UEFI code operable to detect resources within information handling system 100, to provide drivers for the resources, initialize the resources, and access the resources. BIOS/UEFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 3394 (Firewire) interface, a proprietary interface, or a combination thereof. Alternatively, solid-state drive 164 can be disposed within information handling system 100.

I/O bridge 170 includes a peripheral interface 172 that connects the I/O bridge to add-on resource 174, to TPM 176, and to network interface 180. Peripheral interface 172 can be the same type of interface as I/O channel 112 or can be a different type of interface. As such, I/O bridge 170 extends the capacity of I/O channel 112 when peripheral interface 172 and the I/O channel are of the same type, and the I/O bridge translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as I/O interface 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management device 190 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 100. In particular, management device 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management device 190 can include a network connection to an external management system, and the management device can communicate with the management system to report status information for information handling system 100, to receive BIOS/UEFI or system firmware updates, or to perform other task for managing and controlling the operation of information handling system 100.

Management device 190 can operate off of a separate power plane from the components of the host environment so that the management device receives power to manage information handling system 100 when the information handling system is otherwise shut down. An example of management device 190 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 190 may further include associated memory devices, logic devices, security devices, or the like, as needed or desired.

Figure 2:
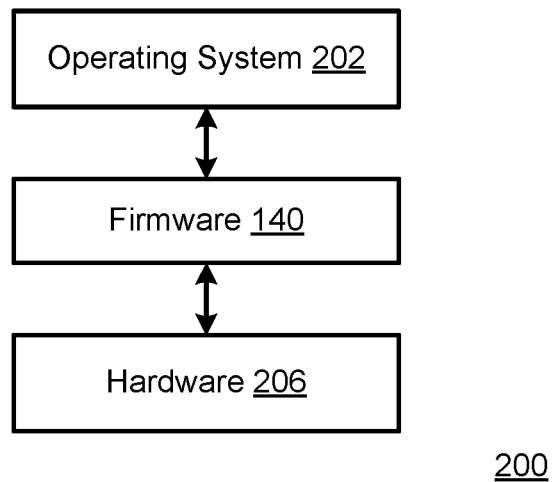
FIGS. 2 and 3 are block diagram of examples of aspects of an extensible firmware interface (EFI) environment according to a specific embodiment of the present disclosure.

FIG. 2 shows examples of aspects of an EFI environment created by BIOS/EFI firmware 140 of the information handling system. For example, BIOS/EFI firmware 140 includes firmware compatible with the EFI specification. The EFI specification describes an interface between OS 202 and BIOS/EFI firmware 140. Particularly, the EFI specification defines the interface that BIOS/EFI firmware 140 implements and the interface that OS 202 may use in booting. According to an implementation of EFI, both EFI and legacy BIOS support modules may be present in BIOS/EFI firmware 140. This allows the information handling system to support both firmware interfaces. Addition details regarding the architecture and operation of the EFI are provided below.

Figure 3:
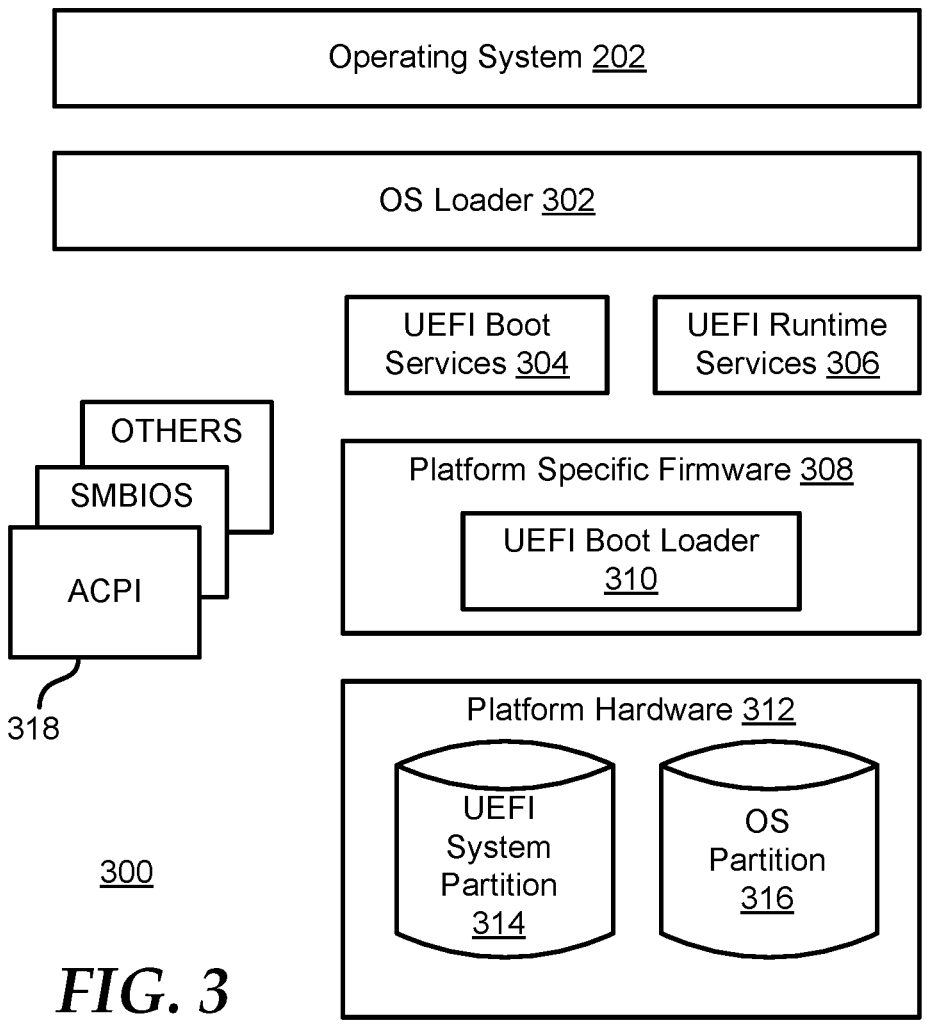

FIG. 3 shows a software architecture 300 that illustrates aspects of UEFI 140 of FIG. 1 and OS 202 of FIG. 2. Specifically, software architecture 300 includes platform hardware 312 and OS 202. Platform specific firmware 308 may retrieve OS program code from UEFI system partition 314 using OS loader 302, also known as a boot loader or OS boot loader. OS loader 302 may retrieve OS program code from other locations, including from attached peripherals or from firmware 140, itself. An OS partition 316 may also be present. Once started, OS loader 302 continues to boot OS 202. OS loader 302 may use UEFI boot services 304 to support other specifications 318. Examples of other supported specifications 318 include advanced configuration and power management interface (ACPI), system management BIOS (SMBIOS), and the like. UEFI boot services 304 may provide interfaces for devices and system functionality that can be used during boot time. UEFI runtime services 306 may be available to OS loader 302 during the boot phase and to OS 202 when running. For example, runtime services 306 may be present to ensure appropriate abstraction of base platform hardware resources that may be needed by OS 202 during normal operation.

UEFI allows extension of platform firmware by loading UEFI drivers and UEFI application images which, when loaded, have access to UEFI runtime and boot services 304. Various program modules provide the boot and runtime services. These program modules may be loaded by boot loader 310 at system boot time. EFI boot loader 310 is a component in the UEFI firmware that determines which program modules should be explicitly loaded and when. Once the UEFI firmware is initialized, it passes control to boot loader 310. Boot loader 310 may be then responsible for determining which program modules to load and in which order.

UEFI images can include UEFI drivers, applications, and boot loaders, and are a class of files defined by UEFI that contain executable code. UEFI boot loader 310 and a boot manager in particular, is a firmware policy engine that is in charge of loading the operating system loader and all necessary drivers. UEFI applications can be loaded by the boot manager or by other UEFI applications to accomplish platform specific tasks within the boot services environment. A UEFI driver is a module of code typically inserted into firmware via protocols interfaces. UEFI drivers can be loaded by the boot manager, firmware conforming to the UEFI specification, or by other UEFI applications. Each UEFI image includes one or more UEFI protocols. A UEFI protocol, also referred to as a protocol interface, is much like a class in object-oriented programming, providing an interface structure containing data definitions, and a set of functions, such as functions to access a device. Each UEFI protocol includes a globally unique identifier (GUID), which is a 128-bit value used to differentiate services and structures in the boot services environment.

The UEFI boot flow can be divided into a sequence of phases, including a pre-EFI initialization (PEI) phase, followed by a driver execution environment (DXE) phase, a boot device selection (BDS) phase, and a run time (RT) phase. The UEFI boot sequence can include additional phases, and one or more phases can be subdivided into two or more sub-phases. For clarity and brevity, details of these phases will not be described except to describe aspects of the present disclosure. The DXE phase is where most of the system initialization is performed. Pre-EFI Initialization (PEI), the phase prior to DXE, is responsible for initializing permanent memory in the platform so that the DXE phase can be loaded and executed. There are several components in the DXE phase, including a DXE foundation, DXE dispatcher, and a set of DXE drivers.

In order to support platform specific security policies for DXE driver execution, the DXE dispatcher is required buy the UEFI specification to use the services of the security architecture protocol (SAP) every time a firmware volume is discovered and every time a DXE driver is loaded. In an example, the proprietary authentication policy can extract an authentication signature from a firmware volume and attempt to validate the signature using an OEM authentication procedure, such as RSA encryption, a hashing algorithm, or the like. In another example, if the extracted authentication signature is not recognized as an original equipment manufacturer (OEM) signature, the authentication policy may attempt to authenticate the extracted signature using a Secure Boot procedure provided by the UEFI specification.

Secure Boot provides a mechanism for authenticating drivers and loaders that can be installed during boot initialization of information handling system 100. The Secure Boot protocol provided by the UEFI specification is configured to prevent the loading of UEFI drivers and operating system (OS) loaders that are not signed with an acceptable digital signature. Secure Boot does this by maintaining databases of software signers and software images that are pre-approved to run on a computer, such as a host server. In particular, the Secure Boot protocol defines an allow list database (DB) for image hashes of UEFI applications, software loaders, and UEFI device drivers that can be loaded on the computer during an initialization or boot procedure.

For example, the DB database can store a public key certificate authorizing execution of an operating system loader, such as the Microsoft Boot Manager. The Secure Boot protocol also defines a revoked or deny database (DBX) for storing images that are no longer trusted and may not be loaded during a boot procedure. For example, a Secure Boot compliant BIOS is configured to execute a signed device driver only if the driver is identified in the DB database, and will refuse to execute the driver if the driver is identified in the DBX database. The Secure Boot protocol further defines a Platform Key (PK) and a Key Exchange Key (KEK) database. As used herein, the term Secure Boot protocol refers to operational features and requirements defined by the UEFI Secure Boot specification, and should not be confused with a UEFI protocol, which refers to a software interface used for communication between two binary modules.

Databases DB, DBX, PK, and KEK may be stored as authenticated UEFI non-volatile variables in the BIOS flash memory. For example, an OEM may store allow list database, revoked or deny list database, and KEK signature database on the firmware nonvolatile random access memory (NVRAM) at manufacturing time. After firmware validation and testing, the OEM can lock the firmware and generates a Platform Key. PK may be used to sign updates to KEK or to turn off Secure Boot. During power-on-self-test (POST), a LoadImage( ) function loads a UEFI image (UEFI executable) into memory and returns a handle to the image. When the UEFI Loadimage( ) function is called, Secure Boot authentication check code can be invoked to make sure the image is from a trusted source, for example the driver's digital signature is verified by a certificate included in the allow list database and is not included in revoked or deny list database. Secure Boot may include two operating policies in BIOS Setup Options, Standard policy and Custom policy. In the Standard policy, the keys are pre-provisioned in the BIOS, for example by an OEM. Keys and certificates can only be added or deleted by signing the contents by previously trusted keys that are programmed in the BIOS, or by updating BIOS firmware that contains different keys. In the Custom policy more flexibility is added to allow a physically present user to modify the contents of the Secure Boot signature databases, the user can even turn off Secure Boot by deleting PK.

Figure 4:
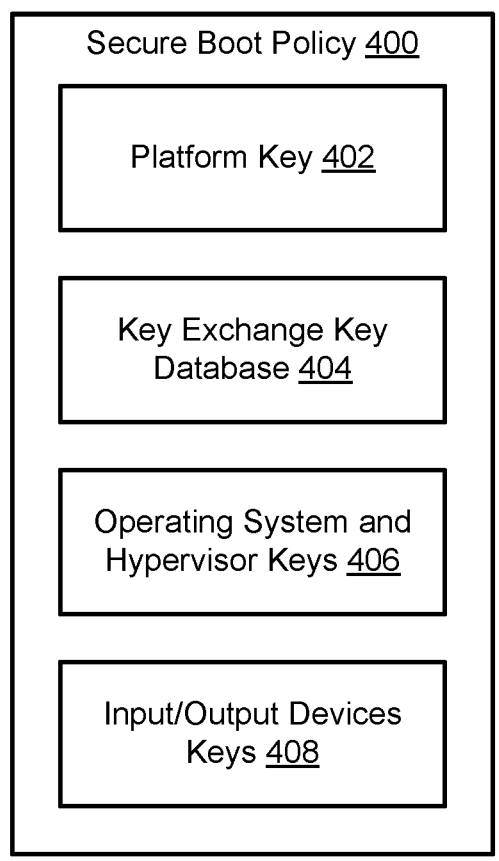
FIG. 4 is a block diagram of an example of a secure boot policy according to a specific embodiment of the present disclosure.

To better illustrate the foregoing, FIG. 4 is a block diagram of an example of Secure Boot policy 400. As illustrated, Secure Boot policy 400 includes platform key (PK) 402, Key Exchange Key (KEK) database 404, operating system/hypervisor (OS/HV) keys 406, and input/output (I/O) devices keys 408. In an example, secure boot 400 may operate in any of four different modes, such as setup mode, user mode, audit mode, and deployed mode. In an example, secure boot policy 400 is usable by BIOS/EFI firmware 140 of information handling system 100 in FIG. 1 to determine whether or not to load one or more pre-boot firmware modules. For example, BIOS firmware 140 may utilize secure boot policy 400 during a DXE phase of a booting process. As used herein, the term "pre-boot firmware module" refers to any Unified EFI (UEFI) image that begins executing before the ExitBootServices( ) operation completes. Examples of pre-boot firmware modules include, but are not limited to, device I/O firmware and OS boot loaders. In many situations, the user may not have access to the image of the driver, firmware, or boot loader.

In some cases, an allow list database may store a public key certificate authorizing execution of an OS loader, such as a Windows program compatibility assistant (PCA), option ROMs of a particular device, or the like. A revoked list database may be used for storing keys, certificates, or hashes for images that are no longer trusted and may not be loaded during a boot procedure. For example, a Secure Boot compliant BIOS is configured to execute a signed device driver only if the driver is identified in allow list database, and will refuse to execute the driver if the driver is identified in deny list database. The Secure Boot policy further defines PK 402, which can be used to verify updates to KEK 402. In some embodiments, KEK 404 may be a separate database of signing keys that can be used to verify updates to allow list database and deny list database.

Databases PK 402, KEK 404, OS/HV keys 406, and I/O devices keys 408 may be stored as authenticated UEFI non-volatile variables in a flash memory. For example, an original equipment manufacturer (OEM) may store PK 402, KEK 404, OS/HV keys 406, and I/O devices keys 408 on the firmware nonvolatile random access memory (NVRAM) at manufacturing time.

In an example, information handling system 100 may include one of multiple different levels of secure boot policy 400. In certain examples, the different levels of secure boot policy 400 may control the type of keys in the secure boot policy. For example, if secure boot policy 400 is a standard policy, the secure boot policy may include industry keys for both OS/HV keys 406 and I/O devices keys 408. When secure boot policy 400 is a standard policy, the secure boot policy may trust a wide array of signed firmware and signed OS loaders.

In certain example, if secure boot policy 400 is a first level custom policy, the secure boot policy may include custom keys for OS/HV keys 406 but industry standard keys for I/O devices keys 408. When secure boot policy 400 is the first level custom policy, the secure boot policy may trust only a specific OS loader, but may trust a wide array of signed I/O device firmware. If secure boot policy 400 is a second level custom policy, the secure boot policy may include custom keys for OS/HV keys 406 and custom keys for I/O devices keys 408. As used herein, keys, such as OS/HV keys 406 and I/O devices keys 408, may refer to public key certificates or hash values. For example, BIOS 140 may authorize I/O device firmware either by verifying its digital signature using a public key certificate, or by comparing the I/O device firmware hash value with a hash value in I/O Device keys 408. When secure boot policy 400 is a second level custom policy, the secure boot policy may trust only a specific OS loader and specific device firmware. As the level of secure boot policy 400 increases from the standard policy, to the first custom level, and to the second custom level, information handling system 100 may become more secure because secure boot policy 400 may trust a smaller number of keys. In an example, when secure boot policy 400 is in the first or second custom level, an individual associated with information handling system 100 has to manage the keys. For example, if an I/O device has a firmware update, the individual has to update the I/O device keys 408 for that particular I/O device.

In previous information handling systems, if firmware for an I/O device is updated, an individual associated with information handling system 100 may need to manually update secure boot policy 400 that authorizes the firmware of the I/O device. In these previous information handling systems, the individual had to cause BIOS to update the hash value associated with an option ROM of the I/O device with the firmware update. Information handling system 100 may be improved by BIOS 140, BMC 190, or another component within the information handling system to automate the update process for I/O keys 408 associated with the I/O device having the firmware update.

Figure 5:
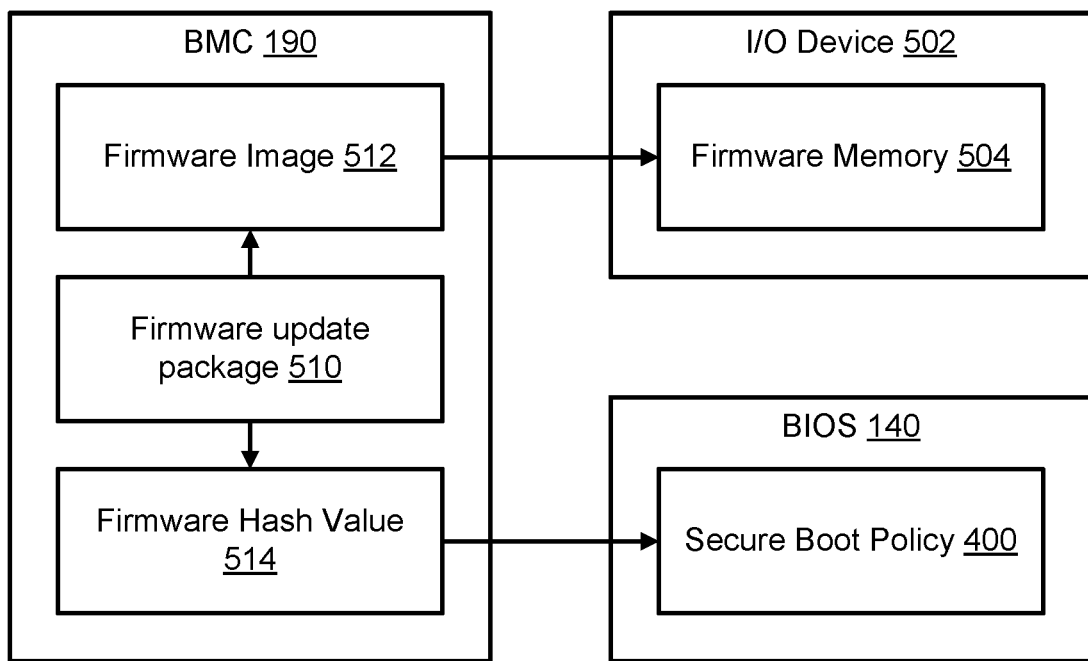
FIG. 5 is a block diagram of a portion of an information handling system according to an embodiment of the present disclosure.

FIG. 5 illustrates a subset of components 500 of information handling system 100 according to an embodiment of the present disclosure. Subset of components 500 includes an I/O device 502, BIOS 140, and BMC 190. I/O device 502 includes a firmware memory 512. When secure boot policy 400 is a second custom level the I/O device keys 408 are custom keys that need to be updated in response to a firmware update of I/O device 502 as will be described below. During a firmware update, BMC 190 may communicate with I/O device 502 and BIOS 140 to automate the firmware update for I/O device 502.

In an example, a firmware update package 510 may include any suitable data for a firmware update of I/O device 502. For example, data included in firmware update package 510 may include, but is not limited to, a new firmware image 512 for I/O device 502, a unique identifier for the I/O device, and a firmware hash value 514 associated with the new firmware image, and other suitable data as shown in FIG. 6.

Figure 6:
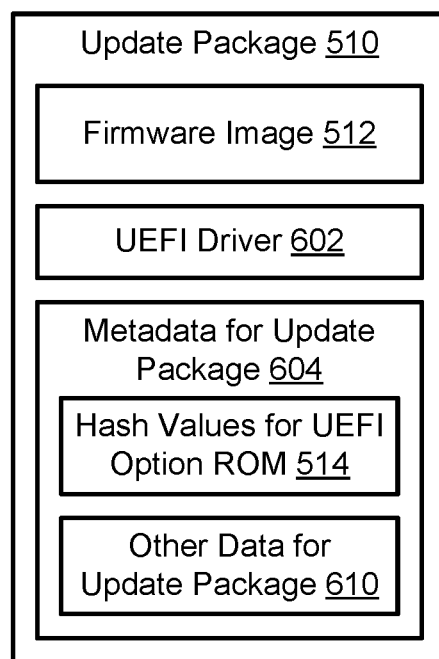
FIG. 6 is a block diagram of an exemplary update package for a device in an information handling system according to an embodiment of the present disclosure.

FIG. 6 illustrates an exemplary firmware update package 510 according to at least one embodiment of the present disclosure. Firmware update package 510 includes a UEFI driver 602, metadata 604 for the update package, and firmware image 512. Metadata 604 includes hash values 514 for the UEFI option ROM, and other data 610 for update package 510. In an example, firmware image 512 may code executable by the device associated with update package 510. UEFI driver 602 may be loaded by UEFI 140 of FIG. 1 as part of the secure boot process. In an example, hash values 514 may be calculated only for the UEFI option ROM and not the entire update package 510. In certain examples, update package 510 may include a signature to authenticate the entire contents or data within the update package.

Referring to FIG. 5, the unique identifier for I/O device 502 may enable BMC 190 to store firmware image 512 in the proper I/O device 502, assign the firmware hash value to the correct firmware image, or the like. In certain examples, firmware hash value 514 included within firmware update package may be calculated and supplied by a firmware vendor, may be calculated by an entity associated with information handling system 100, or the like. The calculated firmware hash value 514 may then be added to firmware update package 510. In an example, firmware hash value 514 may be calculated or associated with an option ROM/UEFI driver, which in turn is a subset of firmware image 512.

In certain examples, BMC 190 may receive a firmware update package 510 associated with I/O device 502. For example, an entity associated with I/O device 502 may push firmware update package 510, an entity associated with information handling system 100 may push firmware update package, BMC 190 may retrieve the firmware update package from a cloud firmware update database, or the like. In response to firmware update package 510 being received, BMC 190 may perform one or more suitable operations to execute firmware update package 514.

In an example, execution of firmware update package 514 may include any suitable operations, such as performing a firmware update for I/O device 502. In an example, BMC 190 performs the firmware update process by replacing a firmware image stored in firmware memory 504 with firmware image 512 from firmware update package 510. In certain examples, firmware memory 504 may be located within and/or associated with a BIOS of I/O device 502.

In response to the firmware update being successfully completed, BMC 190 may update custom secure boot policy 400 in BIOS 140. In an example, BMC 190 may include an interface with BIOS 140 to perform the update of custom secure boot policy 400. During the update of custom secure boot policy 400, BMC 190 may perform any suitable operations to update the hash value or key for I/O device 502 in I/O device keys 408 of secure boot policy 400. In certain examples, BMC 190 may use a public key to verify the private key signature of firmware hash value 514 prior to the firmware hash value being stored with secure boot policy 400. BMC 190 may include a firmware inventory table to store a list of unique identifiers for I/O devices with corresponding firmware hash values. BMC 190 may utilize the firmware inventory table to determine an old firmware hash value for the I/O device. In an example, BMC 190 may delete the old hash value for the previous firmware version of I/O device 502 from the allow list database of secure boot policy 400. In another example, BMC 190 may move the old hash value from the allow list database to the deny list database of secure boot policy 400.

After the old firmware version is deleted from the allow list database or moved to the deny list database, BMC 190 may add firmware hash value 514 to secure boot policy 400 in BIOS 140. In an example, an individual associated with information handling system 100, may enable and disable the automated update of secure boot policy 400 in any suitable manner. For example, the selection, such as enabling or disabling, of the automated update may be made via a configuration setting in an update package GUI, a GUI of BIOS 140, a GUI of BMC 190, or the like.

Figure 7:
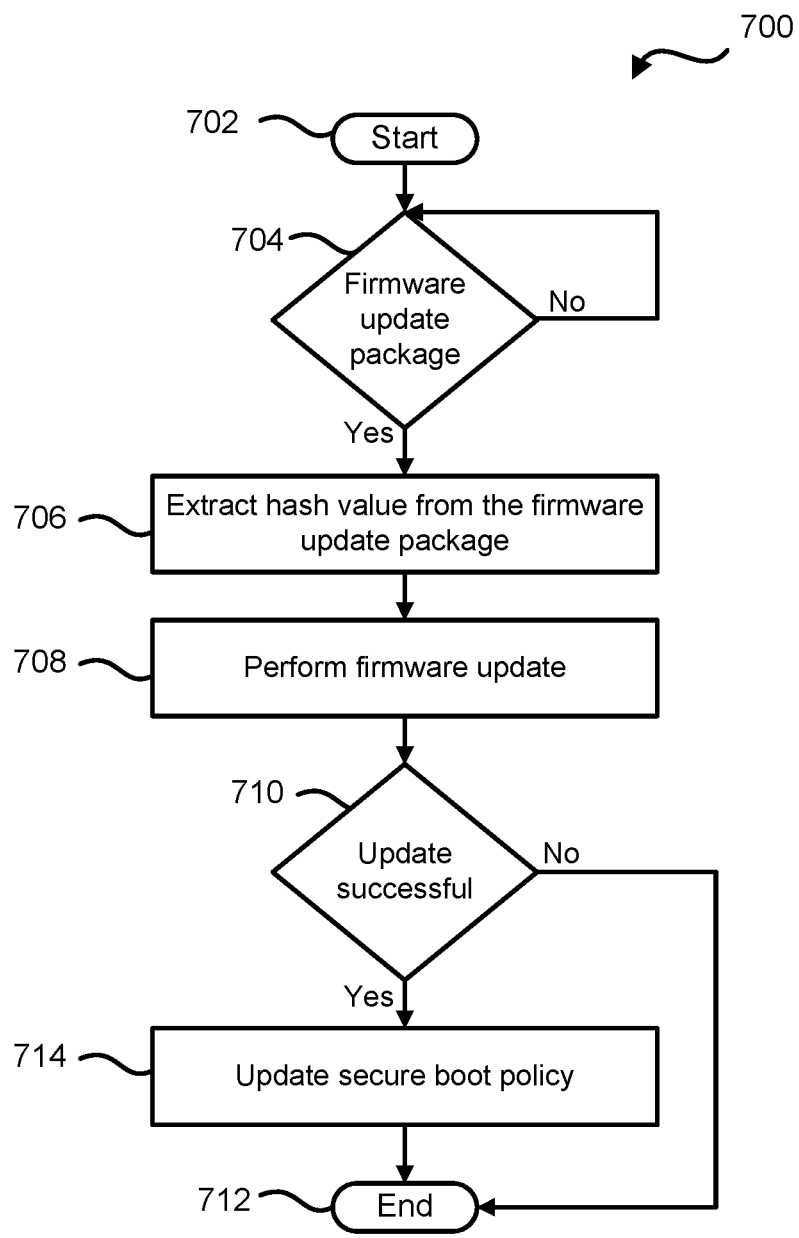
FIG. 7 is a flow diagram of a method for performing an automated update of a customized secure boot policy according to at least one embodiment of the present disclosure.

FIG. 7 is a flow diagram of a method for performing an automated update of a customized secure boot policy according to at least one embodiment of the present disclosure, starting at block 702. In an example, the method 700 may be performed by any suitable component including, but not limited to, BIOS 140 and BMC 190 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 704, a determination is made whether a firmware update package has been received. In an example, the firmware update package may be received by a BMC of the information handling system from any suitable source, such as an entity associated with an I/O device, an entity associated with the information handling system, or the like. In response to firmware update package being received, a hash value is extracted from the firmware update package at block 706. At block 708, the firmware update is performed. In an example, a BMC may perform one or more suitable operations to execute firmware update. For example, the BMC may perform the firmware update by replacing a firmware image stored in a firmware memory of the I/O device with the new firmware image from firmware update package.

At block 710, a determination is made whether the firmware update was successful. If not, the method ends at block 712. If the firmware update was successful, the custom secure boot policy is updated at block 714, and the flow ends at block 712. In an example, the BMC of an information handling system updates the custom secure boot policy in a BIOS of the information handling system. In an example, the BMC may delete the old hash value for the previous firmware version of I/O device from an allow list database of the secure boot policy and then store the new hash value in the allow list database. In another example, BMC 190 may move the old hash value from the allow list database to the deny list database of secure boot policy and then store the new hash value in the allow list database.

Figure 8:
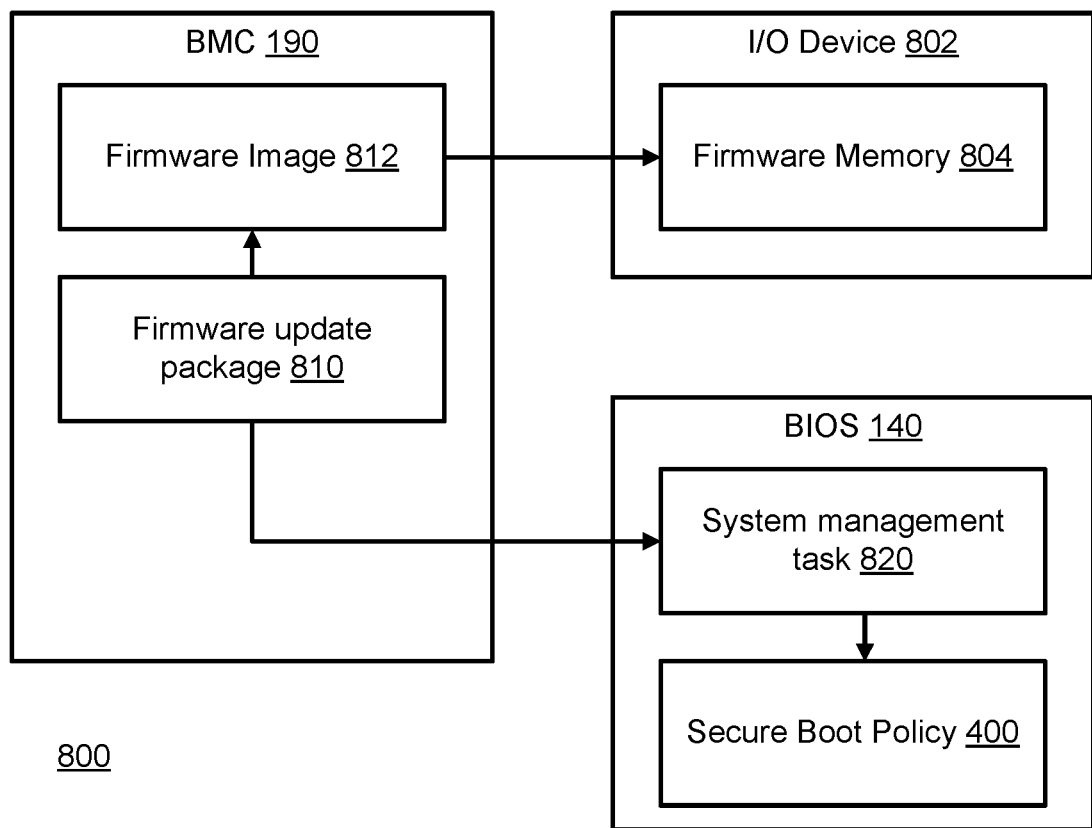
FIG. 8 is a block diagram of a portion of an information handling system according to an embodiment of the present disclosure.

FIG. 8 illustrates a subset of components 800 of information handling system 100 according to an embodiment of the present disclosure. Subset of components 800 includes an I/O device 802, BIOS 140, and BMC 190. I/O device 802 includes a firmware memory 804. When secure boot policy 400 is a second custom level the I/O device keys 408 are custom keys that need to be updated in response to a firmware update of I/O device 802 as will be described below. During a firmware update, BMC 190 may communicate with I/O device 802 and BIOS 140 to automate the firmware update for I/O device 802 and an update of secure boot policy 400.

In an example, a firmware update package 810 may include any suitable data for a firmware update of I/O device 802. For example, data included in firmware update package 810 may include, but is not limited to, a new firmware image 812 for I/O device 802 and a unique identifier for the I/O device.

In certain examples, BMC 190 may receive firmware update package 810 associated with I/O device 802. For example, an entity associated with I/O device 802 may push firmware update package 810, an entity associated with information handling system 100 may push firmware update package, BMC 190 may retrieve the firmware update package from a cloud firmware update database, or the like. In response to firmware update package 810 being received, BMC may use a public key to verify the private key signature of the firmware update package. Based on the firmware update package 810 being verified by the public/private key authorization, BMC 190 may perform one or more suitable operations to execute firmware update package 814.

In an example, execution of firmware update package 814 may include any suitable operations, such as performing a firmware update for I/O device 802. In an example, BMC 190 performs the firmware update process by replacing a firmware image stored in firmware memory 804 with firmware image 812 from firmware update package 810.

In response to the firmware update being successfully completed, BMC 190 may create a system management task for BIOS 140. In an example, the system management task may include a unique identifier for I/O device 802. The unique identifier may enable BIOS 140 to associate operations of the system management task to I/O device 802. In an example, the system management task may be stored in a non-volatile memory of BIOS 140.

During a next system boot of information handling system 100, BIOS 140 may detect the system management task. In response to the detection of the system management task, BIOS 140 may execute the task to calculate a hash value for the newly installed firmware image 812. In an example, firmware hash value for newly installed firmware image 812 may be calculated from an option ROM/UEFI driver, which in turn is a subset of firmware image 812.

Based on the firmware hash value being calculated, BIOS 140 may update custom secure boot policy 400. In an example, BIOS 140 uses information in System Management Task 820, such as a unique identifier for I/O device 802, to perform the update of custom secure boot policy 400. During the update of custom secure boot policy 400, BIOS 140 may perform any suitable operations to update the hash value or key for I/O device 802 in I/O device keys 408 of secure boot policy 400. In an example, BIOS 140 may delete the old hash value for the previous firmware version of I/O device 802 from the allow list database of secure boot policy 400. In another example, BIOS 140 may move the old hash value from the allow list database to the deny list database of secure boot policy 400. After the old firmware version is deleted from the allow list database or moved to the deny list database, BIOS 140 may add the calculated firmware hash value to secure boot policy 400.

Figure 9:
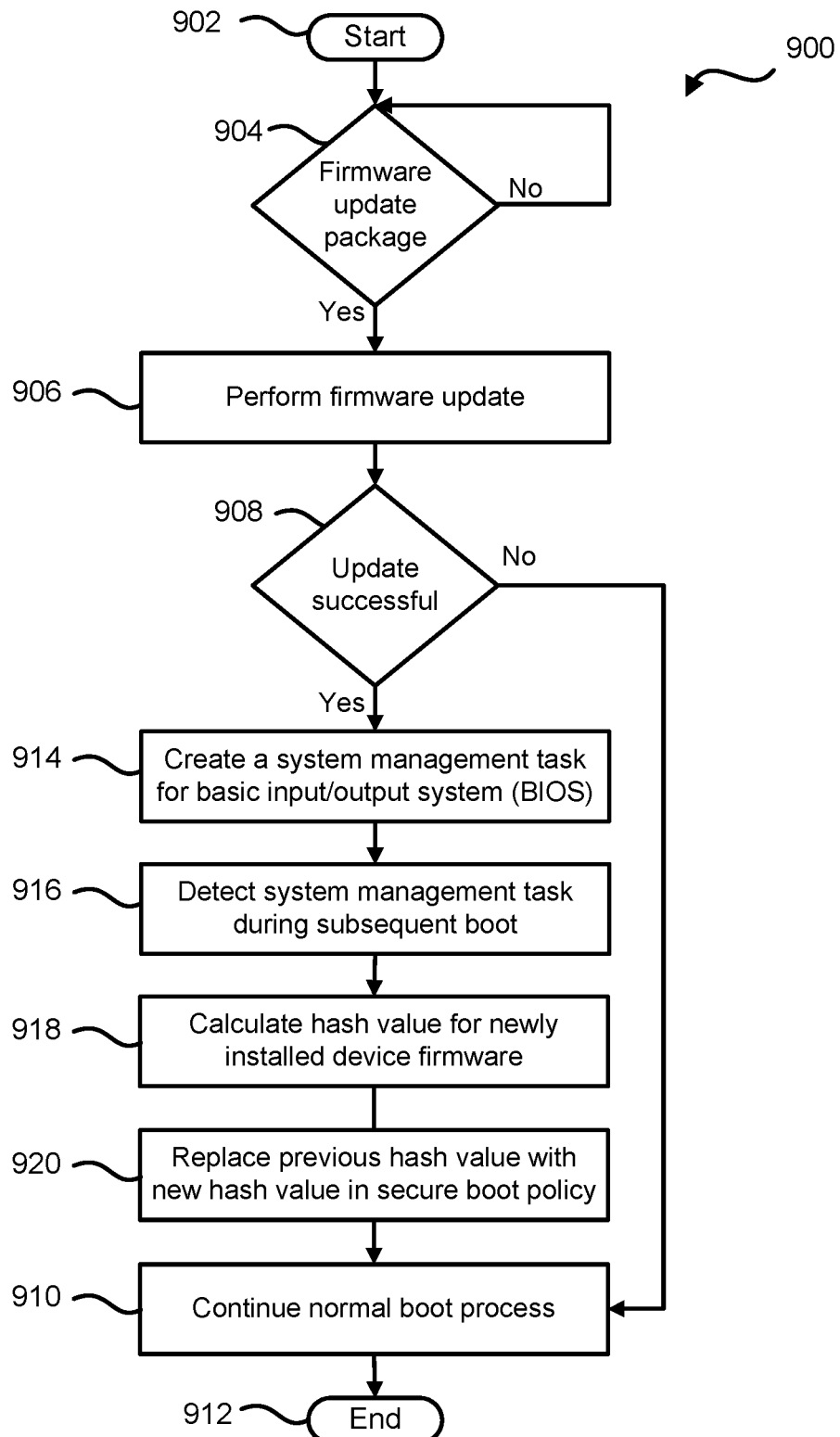
FIG. 9 is a flow diagram of another method for performing an automated update of a customized secure boot policy according to at least one embodiment of the present disclosure.

FIG. 9 is a flow diagram of a method for performing an automated update of a customized secure boot policy according to at least one embodiment of the present disclosure, starting at block 902. In an example, the method 900 may be performed by any suitable component including, but not limited to, BIOS 140 and BMC 190 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 904, a determination is made whether a firmware update package has been received. In an example, the firmware update package may be received by a BMC of the information handling system from any suitable source, such as an entity associated with an I/O device, an entity associated with the information handling system, or the like. In response to firmware update package being received, the firmware update is performed at block 906. In an example, a BMC may perform one or more suitable operations to execute firmware update. For example, the BMC may perform the firmware update by replacing a firmware image stored in a firmware memory of the I/O device with the new firmware image from firmware update package.

At block 908, a determination is made whether the firmware update was successful. If not, the normal boot process is continued at block 910, and the flow ends at block 912. If the firmware update was successfully completed, a system management task for a BIOS of the information handling system is created at block 914. In an example, the system management task may include a unique identifier for I/O device associated with the firmware update. The unique identifier may enable the BIOS to associate operations of the system management task to the I/O device of the newly installed firmware image.

During a next system boot of the information handling system, the system management task may be detected by the BIOS at block 916. In response to the detection of the system management task, a hash value for the new installed device firmware image is calculated at block 918. In an example, the BIOS may execute the system management task to calculate the hash value for the newly installed firmware image. In certain examples, the firmware hash value for newly installed firmware image may be calculated from a subset of firmware image such as an option ROM/UEFI driver.

At block 920, the previous hash value for the firmware of the I/O device is replaced in the secure boot policy. In an example, the BIOS may replace the firmware hash value in the custom secure boot policy, as instructed by the system management task. The BIOS may perform any suitable operations to replace the hash value or key for I/O device in the secure boot policy. In an example, the BIOS may delete the old hash value for the previous firmware version of I/O device from the allow list database of secure boot policy and add the newly calculated firmware hash value in the allow list database. In another example, the BIOS may move the old hash value from the allow list database to the deny list database of secure boot policy. After the old firmware version is moved to the deny list database, the BIOS may add the calculated firmware hash value to allow list database of the secure boot policy.

Those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
a memory to store a secure boot policy for a plurality of input/output (I/O) devices in the information handling system;
a baseboard management controller (BMC) to:
perform a firmware update for a first I/O device of the I/O devices; and
in response to the firmware update being completed successfully, create a system management task; and
a basic input/output system (BIOS), during a next boot after the creation of the system management task, the BIOS to:
detect the system management task;
based on the detection of the system management task, calculate a new hash value for a firmware image of the firmware update; and
replace a previous hash value with the new hash value in the secure boot policy, wherein the replacement includes the BIOS further to:
move the previous firmware hash value from an allow list database within the secure boot policy to a deny list database within the secure boot policy; and
add the new firmware hash value to the allow list database.

2. The information handling system of claim 1, wherein prior to the creation of the system management task, the BMC further to receive a selection to enable an automated secure boot policy update.

3. The information handling system of claim 1, wherein the BMC further to verify a private key signature of the firmware update package prior to the calculation of the new firmware hash value.

4. The information handling system of claim 1, wherein the calculation of the new hash value for the firmware image, the BIOS further to calculate a hash value for an option read only memory (ROM) within the firmware image.

5. The information handling system of claim 1, wherein the system management task includes a unique identifier for the first I/O device.

6. The information handling system of claim 1, wherein the system management task includes previous hash values of each previous firmware versions that were overwritten.

7. A method comprising:
storing, by a baseboard management controller of an information handling system, a secure boot policy for a plurality of input/output (I/O) devices in the information handling system;
performing a firmware update for the first I/O device;
in response to the firmware update being completed successfully, creating, by the BMC, a system management task; and
during a next boot operation of the information handling system:
detecting, by a basic input/output system (BIOS) of the information handling system, the system management task;
based on the detection of the system management task, calculating, by the BIOS, a new hash value for a firmware image of the firmware update; and
replacing a previous hash value with the new hash value in the secure boot policy wherein the replacing includes:
moving the previous firmware hash value from an allow list database within the secure boot policy to a deny list database within the secure boot policy; and
adding the new firmware hash value to the allow list database.

8. The method of claim 7, wherein prior to the creation of the system management task, method further comprising: receiving a selection to enable an automated secure boot policy update.

9. The method of claim 7, further comprising: verify a private key signature of the firmware update package prior to the calculation of the new firmware hash value.

10. The method of claim 7, wherein the calculating of the new hash value for the firmware image, the method further comprising: calculating a hash value for an option read only memory (ROM) within the firmware image.

11. The method of claim 7, wherein the system management task includes a unique identifier for the first I/O device.

12. The method of claim 7, wherein the system management task includes previous hash values of each previous firmware versions that were overwritten.

13. An information handling system comprising:
a memory to store a secure boot policy for a plurality of input/output (I/O) devices in the information handling system;
a baseboard management controller (BMC) to:
verify a private key signature of the firmware update package;
in response to the private key signature being verified, perform a firmware update for a first I/O device of the I/O devices; and
in response to the firmware update being completed successfully, create a system management task; and
a basic input/output system (BIOS), during a next boot after the creation of the system management task, the BIOS to:
detect the system management task;
based on the detection of the system management task, calculate a new hash value for a firmware image of the firmware update, wherein the new hash value for the firmware image includes a hash value for an option read only memory within the firmware image; and replace a previous hash value with the new hash value in the secure boot policy, wherein the replacement includes the BIOS further to:
move the previous firmware hash value from an allow list database within the secure boot policy to a deny list database within the secure boot policy; and
add the new firmware hash value to the allow list database.

14. The information handling system of claim 13, wherein the system management task includes a unique identifier for the first I/O device, and previous hash values of each previous firmware versions that were overwritten.

* * * * *